US012705961B1

(12) United States Patent
Thomas

(10) Patent No.: US 12,705,961 B1
(45) Date of Patent: Aug. 11, 2026

(54) SYSTEM AND METHOD FOR PROVIDING AN ILLUMINATING, VISUAL INDICATION OF A SPECIFIC PHYSICAL LOCATION AND SITUATION

(71) Applicant: Michael Bernard Thomas, Charlotte, NC (US)

(72) Inventor: Michael Bernard Thomas, Charlotte, NC (US)

( * ) Notice: Subject to any disclaimer, the term of this patent is extended or adjusted under 35 U.S.C. 154(b) by 0 days.

(21) Appl. No.: 19/046,044

(22) Filed: Feb. 5, 2025

Related U.S. Application Data

(60) Provisional application No. 63/554,259, filed on Feb. 16, 2024.

(51) Int. Cl.
*G08B 7/06* (2006.01)
*B60Q 3/35* (2017.01)
(Continued)

(52) U.S. Cl.
CPC .............. *G08B 7/064* (2013.01); *F21S 9/022* (2013.01); *F21V 23/0407* (2013.01); *F21V 23/0442* (2013.01); *G08B 17/06* (2013.01); *B60Q 3/35* (2017.02); *B60Q 7/00* (2013.01); *F21S 6/004* (2013.01); *F21V 21/06* (2013.01); *F21V 23/0435* (2013.01); *F21V 23/045* (2013.01); *F21V 33/0064* (2013.01);
(Continued)

(58) Field of Classification Search
CPC .. F21V 23/0435; F21V 33/0064; F21V 21/06; F21V 33/0076; F21Y 2105/00; F21Y 2105/10; F21Y 2105/12; F21Y 2105/14; F21Y 2105/16; F21Y 2105/18; G08B 5/36; G08B 5/38; G08B 3/1016; G08B 7/064; B60Q 3/35; B60Q 7/00; F21S 6/004
See application file for complete search history.

(56) References Cited

U.S. PATENT DOCUMENTS 4,611,265 A 9/1986 Davis
4,901,461 A 2/1990 Edwards et al.
(Continued)

FOREIGN PATENT DOCUMENTS

GB 2317984 A 4/1998
GB 2418519 A 3/2006

*Primary Examiner* — Colin J Cattanach
(74) *Attorney, Agent, or Firm* — John Rizvi; John Rizvi, P.A.—The Patent Professor®

(57) ABSTRACT

A system for providing an illuminating, visual indication of a specific physical location or situation includes a location and situational information indicator device, which includes an electrical power source, at least one activation switch operable by a user, at least one light emitter configured to emit light responsively to operation of the activation switch(es), and a housing containing the light emitter(s). The housing has one or more non-opaque portions allowing the light emitted by the light emitter(s) to pass through such that the light is visible from outside the housing. A party of interest, who may be physically looking for the specific physical location, may view the light, determine that the light matches a predetermined emergency light indication, and responsively and expeditiously direct themselves or their vehicle towards the light. The light emitter(s) can be further activated by a wired, external activation switch and/or a wireless remote control device.

20 Claims, 8 Drawing Sheets

(51) Int. Cl.

| | |
|---|---|
| ***B60Q 7/00*** | (2006.01) |
| ***F21S 6/00*** | (2006.01) |
| ***F21S 9/02*** | (2006.01) |
| ***F21V 21/06*** | (2006.01) |
| ***F21V 23/04*** | (2006.01) |
| ***F21V 33/00*** | (2006.01) |
| ***F21Y 105/00*** | (2016.01) |
| ***F21Y 105/10*** | (2016.01) |
| ***F21Y 105/12*** | (2016.01) |
| ***F21Y 105/14*** | (2016.01) |
| ***F21Y 105/16*** | (2016.01) |
| ***F21Y 105/18*** | (2016.01) |
| ***F21Y 113/17*** | (2016.01) |
| ***G08B 3/10*** | (2006.01) |
| ***G08B 5/36*** | (2006.01) |
| ***G08B 5/38*** | (2006.01) |
| ***G08B 17/06*** | (2006.01) |

(52) U.S. Cl.

CPC ....... *F21V 33/0076* (2013.01); *F21Y 2105/00* (2013.01); *F21Y 2105/10* (2016.08); *F21Y 2105/12* (2016.08); *F21Y 2105/14* (2016.08); *F21Y 2105/16* (2016.08); *F21Y 2105/18* (2016.08); *F21Y 2113/17* (2016.08); *G08B 3/1016* (2013.01); *G08B 5/36* (2013.01); *G08B 5/38* (2013.01)

(56) References Cited

U.S. PATENT DOCUMENTS

| | | | | |
|---|---|---|---|---|
| 5,349,241 | A | 9/1994 | Gilmartin et al. | |
| 5,745,040 | A * | 4/1998 | Loughridge | G08B 7/064 367/199 |
| 5,991,363 | A * | 11/1999 | Thomson | H04M 11/04 379/102.01 |
| 6,098,326 | A | 8/2000 | Campbell, III | |
| 6,507,287 | B1 | 1/2003 | Barnett | |
| 7,299,577 | B2 | 11/2007 | Bisson et al. | |
| 8,408,736 | B2 | 4/2013 | Chien | |
| 10,769,927 | B2 * | 9/2020 | Bauldree | G08B 5/002 |
| 2003/0025607 | A1 * | 2/2003 | Povey | G08B 5/38 340/815.45 |
| 2005/0017863 | A1 * | 1/2005 | Woods | G08B 7/064 340/539.1 |
| 2006/0038691 | A1 * | 2/2006 | Bard | G08B 7/064 340/539.1 |
| 2012/0195035 | A1 * | 8/2012 | Rodriguez | F21V 21/0808 362/190 |
| 2012/0299720 | A1 * | 11/2012 | Griner | B60Q 7/00 340/473 |
| 2015/0100167 | A1 * | 4/2015 | Sloo | H04L 67/54 700/278 |
| 2018/0047261 | A1 * | 2/2018 | Bauldree | G01S 5/0009 |
| 2020/0396339 | A1 * | 12/2020 | Rodriguez | G06F 9/542 |
| 2025/0216040 | A1 * | 7/2025 | Davis | F21V 17/02 |

* cited by examiner

SYSTEM AND METHOD FOR PROVIDING AN ILLUMINATING, VISUAL INDICATION OF A SPECIFIC PHYSICAL LOCATION AND SITUATION

CROSS-REFERENCE TO RELATED APPLICATION

This application claims the benefit of U.S. Provisional Patent Application Ser. No. 63/554,259 filed on Feb. 16, 2024, which is incorporated herein by reference in its entirety.

FIELD OF THE INVENTION

The present invention relates generally to emergency or non-emergency signaling, and more particularly, to a system and method for providing an illuminating, visual indication of a specific physical location and situation, configured to facilitate first responders, delivery services, and or other parties of interest in finding and driving to a specific physical location during an emergency or non-emergency situation.

BACKGROUND OF THE INVENTION

In moments of crisis, when every second counts, the efficiency of emergency response systems is paramount. The ability to swiftly, accurately, and safely drive to and locate the source of a distress call can mean the difference between life and death. Despite advancements in technology and the widespread use of emergency services or responders (e.g., 911, 112, etc.), particularly ambulances, face a persistent challenge—the difficulty in driving to and pinpointing the exact physical location of a caller. This issue has significant implications for human and property safety, potentially leading to critical delays that may have severe consequences.

When an individual dials an emergency number (e.g., 911, 112, etc.) seeking urgent medical attention or reporting a life-threatening situation, the expectation is that help will arrive promptly. The golden hour, a term widely used in emergency medicine, emphasizes the critical importance of the first 60 minutes following a traumatic injury. Delays in response during this crucial period can dramatically impact the chances of survival and recovery. In medical emergencies, particularly those involving cardiac arrests or severe trauma, every minute lost significantly decreases the likelihood of positive outcomes. Fire emergencies can rapidly escalate, putting lives and property at greater risk when firefighting units struggle to reach the scene promptly. These delays not only impact individual lives but also pose a threat to the broader community, as uncontrolled emergencies can have cascading effects. Thus, rapid response times are the bedrock of effective emergency services.

One of the persistent challenges faced by emergency responders is safely driving to and accurately identifying the caller's physical location. While advancements in technology, such as Enhanced 911 (E911) systems, have been implemented in some regions, allowing emergency services to access more precise location data from mobile devices, challenges arise in situations where the caller is unable to communicate their location due to physical harm or distress, or when the call is made from a landline. Additionally, errors in GPS data or difficulties in obtaining precise location information from densely populated urban areas or remote rural regions further compound the problem. Further, road and highway traffic is a high issue when driving to emergency locations.

Addressing the issue of driving to and locating emergency call origins will typically require a collaborative effort between telecommunication companies, technology developers, emergency responders, and even policymakers. Striking a balance between preserving individual privacy and providing accurate location information during emergencies is essential. Public awareness campaigns can also play a crucial role in educating citizens about the importance of providing accurate location details when calling an emergency number (e.g., 911, 112, etc.). All such efforts, however, are time-consuming and costly.

Accordingly, there is an established need for a solution to at least one of the aforementioned problems. For example, there is a need for a cost-effective, easy-to-deploy solution which facilitates driving to and identifying an emergency location by an ambulance or other first responder.

SUMMARY OF THE INVENTION

According to an implementation of the present disclosure, there is provided a location and information indicator device that comprises at least one light emitter and a controller coupled to the at least one light emitter. The controller is configured to receive an activation signal and activate the at least one light emitter, wherein the at least one light emitter is configured to emit light in at least one color coding upon activation. The location and information indicator device also comprises a housing, enclosing the at least one light emitter. The housing comprises one or more non-opaque portions configured to allow the light emitted by the at least one light emitter to project outward.

In an aspect, the at least one color coding may comprise a first color coding for an emergency situation and a second color coding for a non-emergency situation, the first color coding may comprise a flashing red light for indicating the emergency situation and the second color coding may comprise a fixed yellow light for indicating the non-emergency situation.

In an aspect, the controller may be further configured to activate one or more speakers to emit an audible sound based on the activation signal.

In an aspect, the activation signal may be received from a remote device, wherein the activation signal may comprise one of an emergency activation signal and a non-emergency activation signal.

In an aspect, the activation signal may be received from an activation switch located on the housing, the activation switch may comprise one or more input elements for generating the activation signal that comprises one of an emergency activation signal and a non-emergency activation signal.

In an aspect, the location and information indicator device may comprise a smoke detector that is configured to detect a presence of smoke and transmit the activation signal to the controller, the controller may be configured to activate the at least one light emitter in the first color coding upon receiving the activation signal.

In an aspect, the one or more non-opaque portions may comprise a single non-opaque portion located on a front side of the housing, and the single non-opaque portion may comprise a round non-opaque portion.

In an aspect, the front side may comprise at least one opaque portion arranged about a periphery of the round non-opaque portion.

In an aspect, the location and information indicator device may further comprise a power source that may be configured to provide a power supply to the controller and the at least one light emitter.

According to another implementation of the present disclosure, there is provided a method providing an illuminating visual indication of a location. The method comprises receiving an activation signal and activating at least one light emitter based on the received activation signal. The at least one light emitter is configured to emit light in at least one color coding upon activation. The at least one light emitter is enclosed in a housing that comprises one or more non-opaque portions, the one or more non-opaque portions are configured to allow the light emitted by the at least one light emitter to project outward.

In an aspect, the at least one color coding may comprise a first color coding for an emergency situation and a second color coding for a non-emergency situation, the first color coding may comprise a flashing red light for indicating the emergency situation and the second color coding may comprise a fixed yellow light for indicating the non-emergency situation.

In an aspect, the method may further comprise activating one or more speakers to emit an audible sound based on the activation signal.

In an aspect, the activation signal may be received from a remote device, the activation signal may comprise one of an emergency activation signal and a non-emergency activation signal.

In an aspect, the activation signal may be received from an activation switch located on the housing, the activation switch may comprise one or more input elements for generating the activation signal that comprises one of an emergency activation signal and a non-emergency activation signal.

In an aspect, the method may further comprise detecting a presence of smoke and transmitting the activation signal to a controller upon detection, wherein the controller may be configured to activate the at least one light emitter in the first color coding upon receiving the activation signal.

In an aspect, the one or more non-opaque portions may comprise a single non-opaque portion located on a front side of the housing, the single non-opaque portion may comprise a round non-opaque portion.

In an aspect, the front side may comprise at least one opaque portion arranged about a periphery of the round non-opaque portion.

In an aspect, the method may further comprise providing a power supply to a controller and the at least one light emitter.

According to yet another implementation of the present disclosure, there is provided a location and information indicator system. The location and information indicator system comprises a location and information indicator device and a remote device coupled to the location and information indicator device. The location and information indicator device comprises at least one light emitter and a controller coupled to the at least one light emitter. The at least one light emitter is configured to receive an activation signal and activate the at least one light emitter, wherein the at least one light emitter is configured to emit light in at least one color coding upon activation. The location and information indicator device further comprises a housing enclosing the at least one light emitter, the housing comprising one or more non-opaque portions configured to allow the light emitted by the at least one light emitter to project outward.

In an aspect, the remote device may be configured to transmit the activation signal that may comprise one of an emergency activation signal and a non-emergency activation signal.

The present invention is directed to a system and method for providing an illuminating, visual indication of a specific physical location. The system may include a location and information indicator device. The location and information indicator device may include an electrical power source, at least one activation switch operable by a user, at least one light emitter configured to emit light responsively to operation of the activation switch(es), and a housing containing the light emitter(s). The housing may have one or more non-opaque portions allowing the light emitted by the light emitter(s) to pass through such that the light is visible from outside the housing. A party of interest, who may be physically looking for the specific physical location, may view the light, determine that the light matches a predetermined emergency light indication, and responsively and expeditiously direct themselves or their vehicle towards the light. The light emitter(s) may be further activated by a wired, external activation switch and/or a wireless remote control device.

In a first implementation of the invention, a location and information indicator system may include:

- a location and information indicator device, comprising:
  - an electrical power source,
  - one or more activation switches, operable by a user,
  - at least one light emitter, configured to activate and thereby emit light responsively to operation of the one or more activation switches, and
  - a housing, containing the at least one light emitter, the housing comprising one or more non-opaque portions configured to allow said light emitted by the at least one light emitter to pass therethrough such that said light is visible from outside the housing.

In a second aspect, the location and information indicator device may include a controller, configured to enable activation of the at least one light emitter by electrical power provided by the power source responsively to said operation of the one or more activation switches.

In another aspect, the location and information indicator system may include a remote control device formed as a separate device with respect to the location and information indicator device. The remote control device may be configured to communicate with the controller to remotely provide the controller. The controller may be configured to enable activation of the at least one light emitter by electrical power provided by the power source responsively to an activation signal received from the remote control device.

In another aspect, the remote control device may include an electronic device carried by a user local to the location and information indicator device.

In another aspect, the remote control device may include an electronic device communicating with the location and information indicator device via a computer network.

In yet another aspect, the housing may be configured to stably rest on a horizontal surface, platform, or structure.

In yet another aspect, the housing may be configured for attachment to the horizontal surface, platform, or structure.

In another aspect, the location and information indicator device may include a floor mount. The floor mount may be selectively arrangeable in a deployed position in which the floor mount increases stability of the housing while resting on a horizontal surface.

In another aspect, the floor mount may be selectively arrangeable in an undeployed position, in which the floor mount is received within a recess formed in the housing.

In another aspect, the housing may be embedded or housed within a vertical wall or structure.

In yet another aspect, the housing may include a rear side, which may be mountable to a vertical wall or other structure.

In another aspect, the location and information indicator device may be buoyant in water.

In another aspect, the housing may include a front side. At least one non-opaque portion of the one or more non-opaque portions may be located on the front side.

In another aspect, the at least one non-opaque portion located on the front side may be generally flat.

In another aspect, the at least one non-opaque portion located on the front side may be generally flush and coplanar at least one flat, opaque portion located on the front side.

In another aspect, the at least one flat, opaque portion located on the front side may extend around a periphery of the at least one non-opaque portion located on the front side.

In yet another aspect, the one or more non-opaque portions may consist of a single non-opaque portion located on the front side of the housing.

In another aspect, the one or more non-opaque portions may include a round non-opaque portion located on the front side of the housing.

In another aspect, the round non-opaque portion may have a diameter of at least about 15 inches.

In another aspect, the front side may further include at least one opaque portion arranged about a periphery of the round non-opaque portion.

In yet another aspect, the at least one opaque portion may fully and uninterruptedly surround the round non-opaque portion.

In another aspect, an outer contour of the at least one opaque portion may be rectangular. For example, the outer contour may be square.

In another aspect, at least one activation switch of the one or more activation switches may be located on the front side of the housing.

In another aspect, the at least one light emitter and the one or more non-opaque portions of the housing may be configured such that said light emitted thereby is red.

In yet another aspect, the at least one light emitter and the one or more non-opaque portions of the housing may be configured such that said light emitted thereby is yellow.

In another aspect, the at least one light emitter and the one or more non-opaque portions of the housing may be configured such that said light may be selectively emitted with a first color-coding or a different second color-coding.

In another aspect, the first color-coding may be associated with an emergency situation.

In another aspect, the second color-coding may be associated with a non-emergency situation.

In yet another aspect, the location and information indicator system may include a training material in which the light is associated with an emergency situation, the training material providing an instruction to expeditiously direct a person or vehicle towards said light upon viewing and identifying said light.

In another aspect, the location and information indicator system may include a training material in which the light is associated with a non-emergency situation, the training material providing an instruction to direct a person or vehicle towards said light upon viewing and identifying said light.

In another implementation of the invention, method for providing an illuminating, visual indication of a specific physical location may include the steps of:

- providing a location and information indicator system comprising a plurality of location and information indicator devices, each location and information indicator device comprising:
  - an electrical power source,
  - one or more activation switches, operable by a user,
  - at least one light emitter, configured to activate and thereby emit light responsively to operation of the one or more activation switches, and
  - a housing, containing the at least one light emitter, the housing comprising one or more non-opaque portions configured to allow said light emitted by the at least one light emitter to pass therethrough such that said light is visible from outside the housing;
- installing the plurality of location and information indicator devices in a plurality of different physical locations;
- activating said at least one light emitter to emit light responsively to operation of the one or more activation switches;
- projecting said light outward of the housing via the one or more non-opaque portions;
- viewing said light projected outward of the housing via the one or more non-opaque portions;
- determining, by a party of interest, that a visual indication provided by said light projected outward of the housing via the one or more non-opaque portions matches a predetermined visual indication associated with an emergency situation; and
- responsively, expeditiously directing said party of interest towards said light projected outward of the housing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system and method for providing an illuminating, visual indication of a specific physical location and emergency situation, configured to facilitate first responders, delivery services, and or other parties of interest in finding a specific physical location during an emergency or non-emergency situation.

Figure 1:
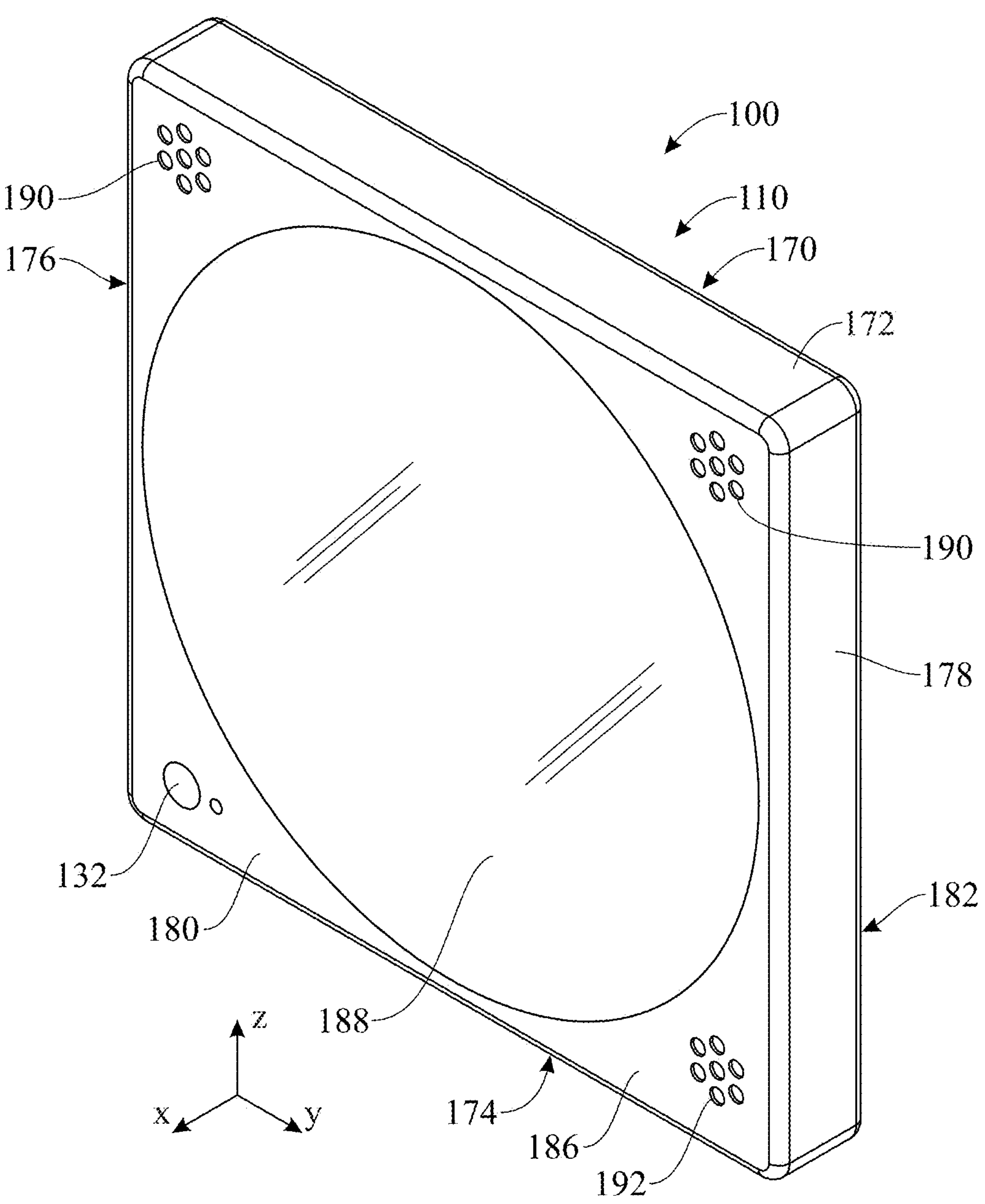
FIG. 1 presents a top, front isometric view of a location and information indicator device of a location and information indicator system in accordance with a first embodiment of the present invention.
Figure 4:
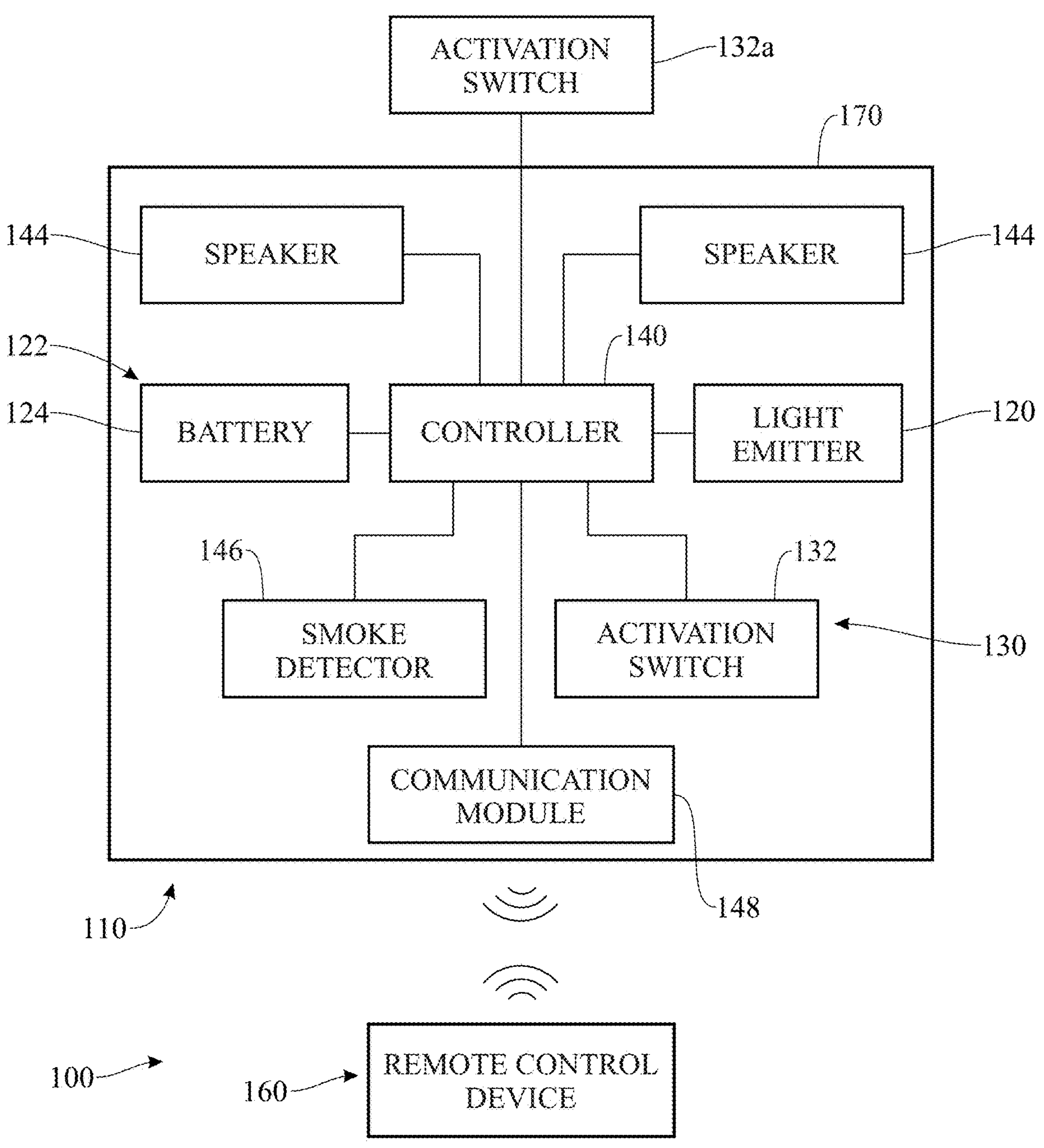
FIG. 4 presents a block diagram of electric/electronic components of the location and information indicator device of FIG. 1, in accordance with an illustrative embodiment of the invention.

Referring initially to FIGS. 1 and 4, a system for providing an illuminating, visual indication of a specific physical location, hereinafter referred to generally as location and information indicator system 100, may include a location and information indicator device 110. As shown in FIG. 4, the location and information indicator device 110 may comprise at least one light emitter 120, such as, but not limited to, one or more light-emitting diodes or LEDs. The location and information indicator device 110 may further include a power source 122, configured to supply electrical power to the at least one light emitter 120. In some embodiments, the power source 122 may include one or more rechargeable or replaceable batteries 124, hereinafter referred to in singular form (battery 124) for simplicity; in such embodiments, the device may function (and thus be seen) in the event of a power blackout. Alternatively or additionally, the power source 122 may include an AC/DC converter, DC/DC converter, and/or other circuitry configured to receive electrical power from an external power source (e.g., AC power grid, DC battery, etc.) and to convert the received electrical power into an adequate DC power configured to power the at least one light emitter 120 and other electrical components of the location and information indicator device 110.

In some embodiments, the location and information indicator device 110 may include a user interface 130 enabling a human user to activate and/or deactivate the at least one light emitter 120. For instance, in some embodiments, the user interface 130 may include at least one physical user-operable control or activation switch 132 which is manually operable by the user; non-limiting examples of such activation switch 132 include, without limitation, a toggle switch, push button, and a tactile, proximity, or capacitive switch. Alternatively or additionally, the user interface 130 may include voice command recognition provided by a controller 140 of the location and information indicator device 110. In some embodiments, there may be more than one switch, such as to activate and deactivate the device. Alternatively or additionally, different switches 132 may be provided in order to selectively switch the device to illuminate in different color-codings (for example, a first switch may be operated to illuminate the at least one light emitter 120 in a first color, and a different, second switch may be operated to illuminate the at least one light emitter 120 in a different, second color). In other embodiments, a same switch 132 may be operated differently to selectively switch the device to illuminate in the different color-codings (for example, the switch may be operated once or twice to illuminate the at least one light emitter 120 in the first color or the second color, respectively). In some embodiments, one or more of the activation switches 132 may be located on the housing 170, as shown. Alternatively or additionally, one or more activation switches 132 may be external to the housing 170; for example, in one embodiment, an interior (in-house) wall switch 132*a* could be installed in a home and wired to the location and information indicator device 110, and the controller 140 may be configured to activate and deactivate the at least one light emitter 120 as a result of switching the interior wall switch 132*a* on and off, respectively.

In embodiments comprising a controller 140, the controller 140 may include one or more microprocessors, microcontrollers, or the like, generally referred to hereinafter as processor. The controller 140 may further include an electronic data storage memory storing software instructions configured to cause the processor to operate as described hereinafter. The controller 140 may be electrically powered by the power source 122. In some embodiments, the power source 122 may permanently power the controller 140 such that the location and information indicator device 110 is permanently switched on and readily available to increase ease of operation and reduce operation times in the event of an emergency. In other embodiments, the controller 140 is not permanently powered by the power source 122; instead, the user interface 130 may include an on/off switch or user-operable control operable to selectively switch the controller 140 on and off.

With continued reference to FIG. 4, in some embodiments, the location and information indicator device 110 may include one or more sound emitters or speakers 144. For instance, the present embodiment includes a pair of speakers 144. The one or more speakers 144 may be operably connected to the controller 140 and configured to emit audible sound for purposes described hereinafter. The one or more speakers 144 may be passive or active, and may be electrically powered by the power source 122.

In some embodiments, the location and information indicator device 110 may include a smoke detector 146. The smoke detector 146 may be operably connected to the controller 140 and configured to provide a smoke detection activation signal to the controller 140 in the event that the smoke detector 146 detects smoke in the vicinity of the location and information indicator device 110. The smoke detector 146 may be electrically powered by the power source 122.

In some embodiments, the location and information indicator system 100 may further include a remote control device 160 formed as a separate device or equipment relative to the location and information indicator device 110. The remote control device 160 may be configured to communicate with the location and information indicator device 110, and more specifically, with a communication module 148 of the location and information indicator device 110. The communication module 148 may be electrically powered by the power source 122. In some embodiments, the communication module 148 may provide wireless communication. For example, the communication module 148 and remote control device 160 may communicate via radiofrequency (RF), such as, but not limited to, via Bluetooth Special Interest Group (SIG) protocols (Bluetooth®), IEEE 802.11 protocols (Wi-Fi™), cellular communication protocols, dedicated RF frequencies, etc. In another example, wireless communication between the communication module 148 and the remote control device 160 may include infrared (IR) communication. Alternatively or additionally, the communication module 148 may enable wired communications (e.g., Ethernet, USB, etc.) with the remote control device 160.

In a non-limiting example, the remote control device 160 may be a smartphone or other portable electronic device carried by a user. In another example, the remote control device 160 may be a computer (e.g., server) communicating with the controller 140 of the location and information indicator device 110 over a computer network (e.g., the Internet).

As shown in FIG. 4, the location and information indicator device 110 may be generally contained within a housing 170. For example, if present, the controller 140, the at least one light emitter 120, the one or more speakers 144, the smoke detector 146, and/or the communication module 148 may be contained inside the housing 170. In preferred embodiments, each and every one of the aforementioned components which is present in the location and information indicator device 110 is contained within and concealed by the housing 170. In some embodiments, the housing 170 may be generally waterproof or water-resistant.

Figure 2:
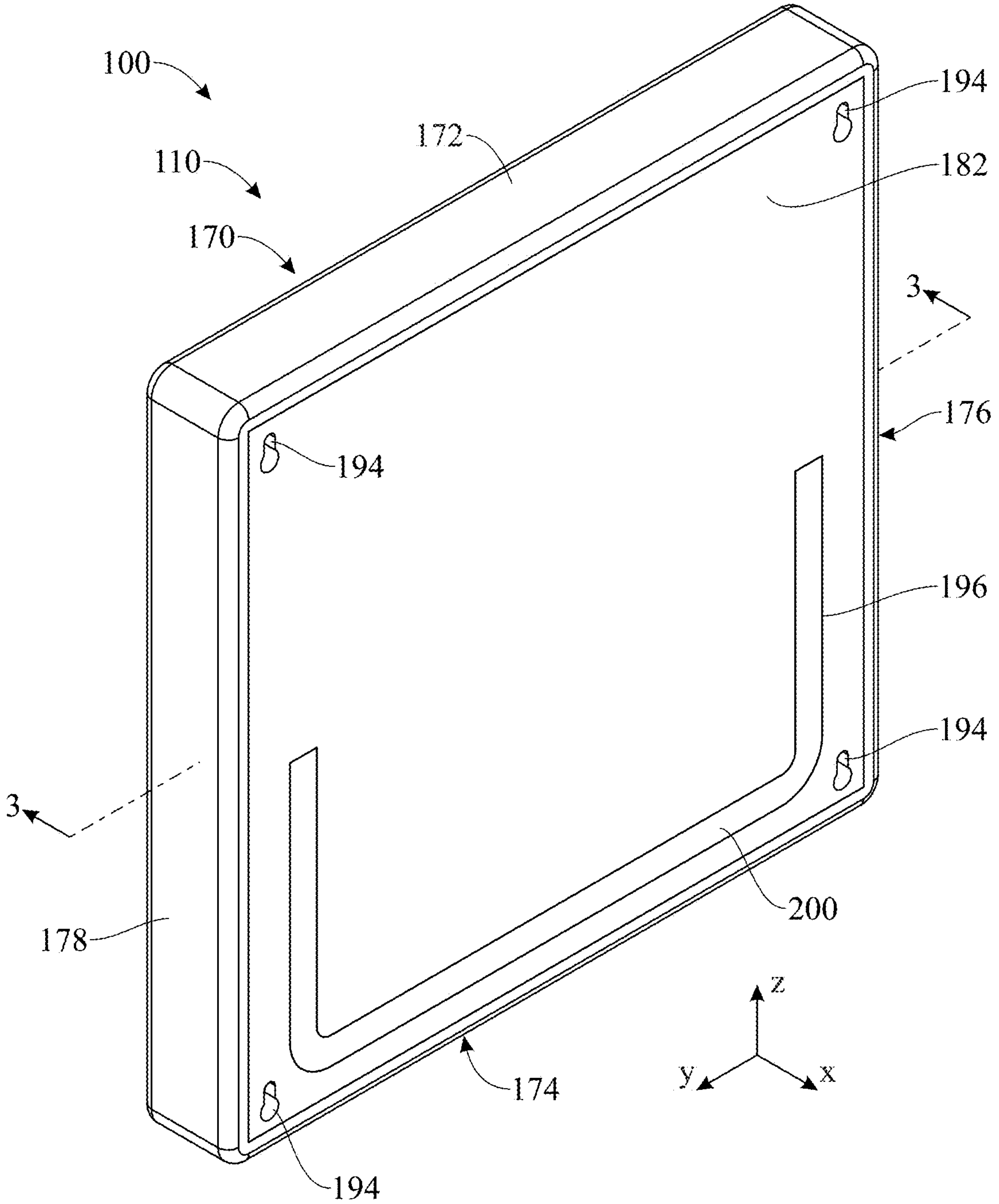
FIG. 2 presents a top, rear isometric view of the location and information indicator device of FIG. 1, with a deployable support of the location and information indicator device shown undeployed.

Turning to FIGS. 1 and 2, the housing 170 may include a top wall or side 172, a bottom wall or side 174, a left wall or side 176, a right wall or side 178, a front wall or side 180, and a rear wall or side 182. The top and bottom sides 172 and 174 may extend rearward from the front side 180 in spaced-apart relationship with one another. In turn, the left and right sides 176 and 178 may extend rearward from the front side 180 and further from and between the top and bottom sides 172 and 174. The rear side 182 may extend from and between the top, bottom, left and right sides 172, 174, 176 and 178, in spaced-apart relationship with the front side 180 such that an interior space 184 (FIG. 3) of the housing 170 is defined by and between all of said sides 172-182.

In some embodiments, the front side 180 may be generally planar or flat, such as arranged along a left-to-right or transverse direction y and a vertical direction z generally perpendicular to the transverse direction y, i.e. along (i.e., generally parallel to) a y-z plane. Alternatively or additionally, the rear side 182 may be generally planar or flat, such as arranged along the transverse direction y and the vertical direction z, along an y-z plane. Alternatively or additionally, the left side 176 may be generally planar or flat, such as arranged along a front-to-back or longitudinal direction x and the vertical direction z, i.e. along an x-z plane. Alternatively or additionally, the right side 178 may be generally planar or flat, such as arranged along the longitudinal direction x and the vertical direction z, i.e. along an x-z plane. Alternatively or additionally, the top side 172 may be generally planar or flat, such as arranged along the longitudinal direction x and the transverse direction y, i.e. along an x-y plane. Alternatively or additionally, the bottom side 174 may be generally planar or flat, such as arranged along the longitudinal direction x and the transverse direction y, i.e. along an x-y plane. For instance, the present embodiment includes all of said features, such that the housing 170 is generally rectangular in shape, with flat and parallel top and bottom sides 172 and 174, flat and parallel left and right sides 176 and 178, and flat and parallel front and rear sides 180 and 182. However, alternative housing shapes are contemplated without departing from the scope of the present disclosure. For instance, the housing may be shaped as a sun or other figurative element, and/or may be received or embedded within a decorative exterior wall artwork, decor, or embellishment.

It should be noted that, as implied by prior statements, the x, y, z directions form an orthogonal axis set.

The housing 170 may be at least partially non-opaque (e.g., transparent or translucent), i.e., configured to allow the passing therethrough of light emitted by the at least one light emitter 120. For example, in the present embodiment, one or more of the top, bottom, left, right, front, and rear sides 172-182 may be at least partially non-opaque. Additionally, in some embodiments, one or more of the top, bottom, left, right, front, and rear sides 172-182 may be at least partially opaque such that opaque portion(s) thereof block the passing therethrough of light emitted by the at least one light emitter 120. For instance, the housing 170 of the present embodiment is such that the top, bottom, left, right and rear sides 172, 174, 176, 178 and 182 are generally opaque, and the front side 180 is partially opaque and partially non-opaque.

Figure 3:
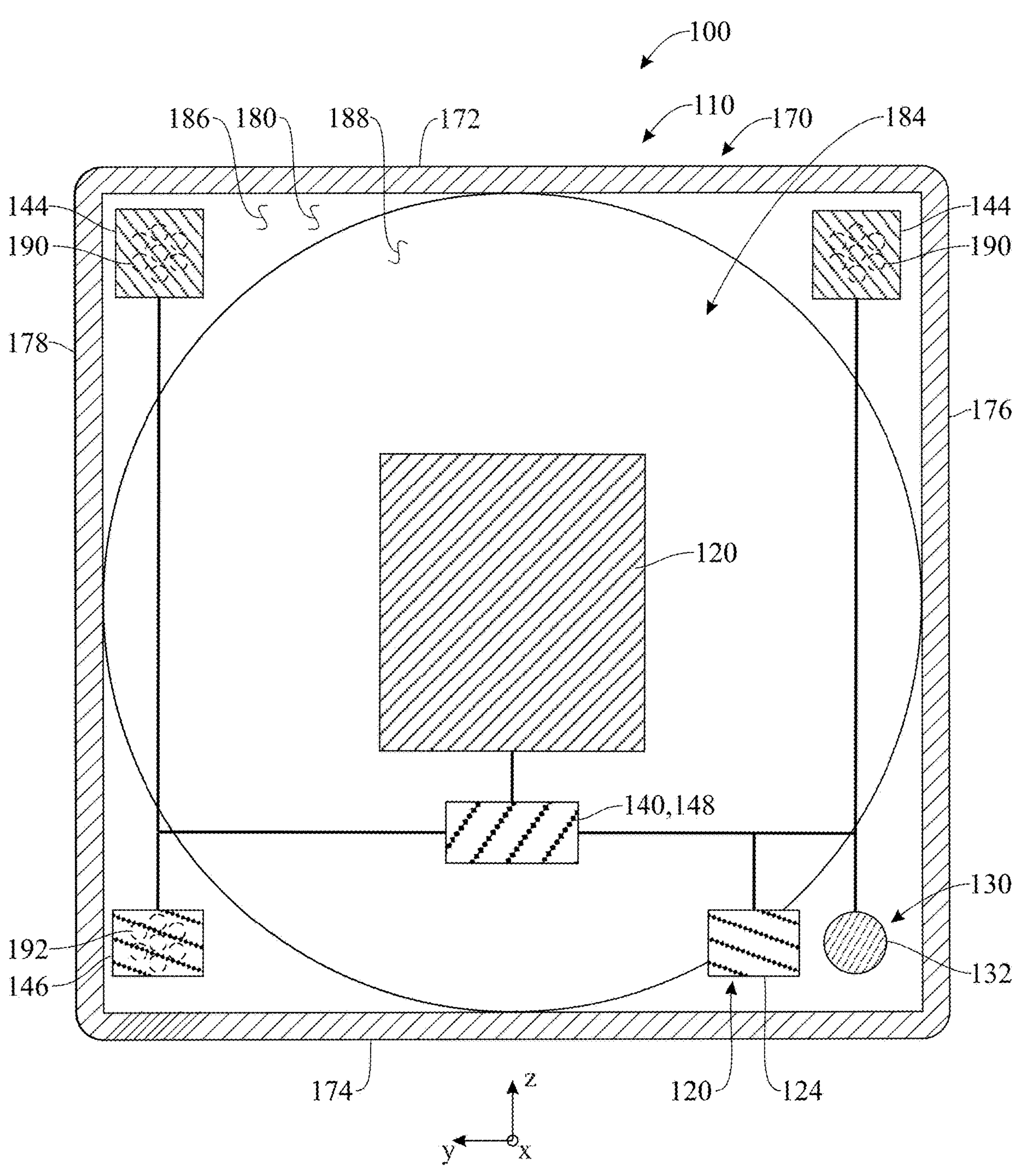
FIG. 3 presents a cross-sectional, rear elevation view of the location and information indicator device of FIG. 1, the cross section taken along section plane 3-3 indicated in FIG. 2.

More specifically, with reference to FIGS. 1 and 3, the front side 180 comprises an opaque portion 186 and a non-opaque portion 188. In some embodiments, the non-opaque portion 188 may be generally circular, as shown, such as having a diameter of at least about 15 inches (about 38 cm) encircled by a generally square-shaped front side opaque portion 186 sized at least about 16×16 inch (about 41×41 cm). As shown in FIG. 3, the at least one light emitter 120 may be located behind (in front-to-back, longitudinal alignment with) the non-opaque portion 188. The opaque portion 186 may extend at least partially around the non-opaque portion 188. For instance, in the present embodiment, the opaque portion 186 extends around an entire periphery of the non-opaque portion 188 and provides the rectangular outer contour of the front side 180.

In some embodiments, the opaque portion(s) of the housing 170 (e.g., opaque portion 186) may be made of wood, plastic, metal, glass, stone, or combinations thereof. In turn, the non-opaque portion(s) of the housing 170 (e.g., non-opaque portion 188) may be made of, or include, a panel, as shown, made of transparent or translucent material (e.g., plastic, acrylic, glass); alternatively or additionally, the non-opaque portion(s) may include a grill, grid, mesh, or other structure configured to allow light to pass therethrough. In a preferred embodiment, shown herein, the non-opaque portion 188 on the front side 180 of the housing 170 is formed as a solid panel made of a transparent or translucent material (e.g., glass, acrylic, etc.) and the remainder of the housing 170 (i.e., the opaque portion 186 of the front side 180, and the remaining top, bottom, left, right, and rear sides 172, 174, 176, 178 and 182) is preferably opaque generally in its entirety, and optionally configured on an inner side thereof (side facing the interior space 184) to reflect light towards the non-opaque portion 188 of the front side 180 to maximize the light intensity emitted through the non-opaque portion 188.

In some embodiments, the location and information indicator device 110 may be configured to emit light radially or transversely beyond the non-opaque portion 188, such that the light indication appears larger than the actual non-opaque portion 188. For example, when the round-shaped non-opaque portion 188 is illuminated, the light may appear to have a larger-diameter circular shape, beyond the diameter of the non-opaque portion 188; in a non-limiting example, the circular, 15-inch diameter non-opaque portion 188 may be capable of producing a generally circular, 13-foot diameter light indication. Alternative dimensions are contemplated without departing from the scope of the present disclosure. Further, in some embodiments, the location and information indicator device 110 (also known as "red moon product") is an 8"×8"×2" light imagined as a black box with a 7.5 inches diameter (or round) opaque lense on the front side.

Further, in some embodiments, the location and information indicator device 110 may resemble a small size pizza box. The light emitter has a white light which works in a motion-sensor mode, and is or could be affixed to a home as a front porch light. The light transforms to a 911 RED flashing emergency light that tells responding ambulance, police, fire and other 911 emergency personnel exactly where the 911-caller help is located.

In some embodiments, the light is called Red Moon because it may turn Red for 911 emergencies. Red Moon also has a mobile model to carry in the car or hand for 911 emergencies. The location and information indicator device 110 may contain a handle, and kick stand on its back to prop or stand it up; and a magnetic back to attach to the back of a car or other metal-magnetic object.

In some embodiments, the red moon is 7½" diameter (or round) opaque light and is adjustable up to a 26 feet in diameter for industrial locations or sites such as airport entrances and exits, construction sites, event sites, danger zones, emergency disaster sites, etc. For residential locations and sites, the red moon is a 7½" diameter (or round) opaque light is adjustable up to a 13 feet in diameter. In some embodiments, the red moon is adjustable in the following increments, such as 3', 6', 9', 13' diameters for residential use, and 13', 16', 19', 22', 25', and 26' feet diameters for industrial use.

Further, in some embodiments, the red color of the red moon is specifically used for 911 emergencies. The white opaque color of red moon lense is designed for outdoor or front porch lighting. The yellow color of red moon is designed for service providers such as taxi cabs, pizza delivery personnel, out-of-town guests, power outage personnel, etc., to let service providers or out-of-town guests know the service-receiver's address or where to stop. The red moon has other colors to be adapted for other reasons or uses such as warning signs, entry signs, exits signs, any sign where an exact location is designated for a specified purpose.

Further, in some embodiments, the red moon which is available as a mobile model may be attached to a tree or other object for camping. It has a 3-foot strap on either side—for a total of six feet—to make attaching it to a tree or other object easy.

In some embodiments, red moon App model is workable on handheld mobile telephones. This app-model may be adjusted to residential or industrial mode to expand its light diameter up to 13-feet for residential use or up to 26-feet for industrial use.

In some embodiments, the red moon has the capacity to project its static and flashing light to a distance of 500-yards outward and upward in residential mode. The light is adjustable in 50-yard increments up to 500 yards, maybe more.

Further, in some embodiments, the red moon has the capacity to project its static-ray and flashing light-ray to a distance of 3-miles outward and upward in industrial mode. The light should be adjustable in ⅛th of a mile increments up to 3-miles. In the event a person, or group is lost in a forest, mountain, valley, or other earthy, or geographic location-beneath trees, snow, rain, fog, or other disorienting-conditions, the red moon alerts emergency personnel, passersby, or aircraft personnel that help is needed at that location.

In some embodiments, the red moon is designed to be built into new construction homes and buildings, also new cars. Further, in some other embodiments, the red moon contains a built-in telescope-type camera which makes an automobile tag 300-yards away appear to be 1-foot away, as it also serves as a surveillance camera recorder. Further, in some other embodiments, the red Moon is waterproof, floatable and for aquatic use, on boats waterways, and other waterway apparatuses.

Further, in some embodiments, the red moon may be electronically ready to connect with and be functional with all major types of external 911 emergency services providers involving emergency calls, action intake, dispatch centers, entities, and apparatuses to the extents that it may be activated by and from a key fob, telephone (long or short distance remote radio frequency activation), or other electronic devices, apparatuses, vehicles, or 911 emergency personnel.

Further, in some other embodiments, the red moon may contain a built-on, or built-in solar energy power supplier and charger apparatus for home, car Red Moons and cell phones Also, the red moon is functional and visible in different places and acts as a different device such as the street red, yellow, green light apparatus useable by street traffic flaggers or flagmen to direct and regulate traffic in work areas, as an example.

In some embodiments, the red moon is functional and interactive with all new technology such as the internet, digitized devices, and apparatuses. In some other embodiments, the red moon is adaptable and interactive with home door locks, alarms, cameras, and other such applicable electronic appliances, and fixtures a homeowner may have. In some embodiments, the red moon may contain a cell phone type flash light for outdoor use. In some other embodiments, the red moon may contain charger connector cords, plugs and apparatuses for use in automobiles, homes, and other power charger locations. In some embodiments, the red moon may be activated by key fob, cell phones, remote control, remote control from long distances (radio frequency level), etc.

In some embodiments, the red moon is energy efficient to the highest standard. Further, in some cases, the red moon may have the capacity of a rainbow, as a worldwide sign or a distant sign from its inventor that something awesome and essential to the benevolence of the world is happening.

In some embodiments, the red moon may be functional as 911-detective, such that it can be detected and located by 911 personnel devices.

In some exemplary embodiments, the red moon may include functionalities such as the red moon may tell seekers where the one sought is found, inquirers where is the location of the one sought, people where to go, people where not to go, the world that this is sign of a warning, the world that this is a sign of a benevolence. Furthermore, the red moon may inform the people, entities, and 911 emergency providers, to cut time in finding and getting to the location, person, thing or situation in need of help.

Further, in some embodiments, all functions of the red moon may be activated both manually and remotely. Further, the red moon may be electronically ready to instantly autodial 911 when activated.

In one example, the broader light indication with respect to the non-opaque portion 188 may be facilitated by the non-opaque portion 188 comprising a wide-angle lens or diffuser that spreads the light in a broader pattern. For instance and without limitation, the wide-angle lens may be arranged on an inner side of the non-opaque portion 188, such as facing the interior space 184 of the housing 170. The wide-angle lens may be configured to disperse the light over a larger area, achieving the desired 13-foot or other larger diameter or otherwise broader coverage with respect to the non-opaque portion 188. As mentioned heretofore, alternative dimensions are contemplated without departing from the scope of the present disclosure.

Alternatively or additionally, the broader light indication with respect to the non-opaque portion 188 may be facilitated by one or more light reflectors and/or reflective surfaces configured to reflect light from inside the housing 170 such that said light is redirected radially outward with respect to the non-opaque portion 188 to distribute the light in a wider pattern or scatter the light.

In yet another example, the broader light indication may be alternatively or additionally obtained by a Fresnel lens configured to focus or spread light in a radially outward or broader manner. In a non-limiting example, the Fresnel lens may be comprised in the non-opaque portion 188, such as on an inner side or layer thereof, an outer side or layer thereof, and/or an intermediate layer thereof.

In some embodiments, the opaque and non-opaque portion(s) of the housing 170 may be generally flush or coplanar with one another on an outer side of the housing 170. For example, in a preferred embodiment, the opaque portion 186 and the non-opaque portion 188 of the front side 180 are generally flush or coplanar with one another on an outer side of the front side 180, shown in FIG. 1. In some embodiments, the non-opaque portion 188 may include indicia and/or decorative elements, such as, but not limited to, images of aircraft, police, fire, and ambulance vehicles; the indicia and/or decorative elements may be raised, recessed, adhered, or otherwise provided on the non-opaque portion 188. In one embodiment, there may be one decorative element or indicia per quadrant of the round non-opaque portion 188.

With continued reference to FIG. 1, the housing 170 may include one or more speaker openings 190, which may be adjacent or near the one or more speakers 144 thereby promoting sound travel from the speakers 144 (located inside the housing 170) to outside the housing 170. In some embodiments, the housing 170 may include one or more sensor openings 192, which may be adjacent or near the smoke detector 146 (located inside the housing 170) thereby facilitating smoke from outside the housing 170 being sensed by the smoke detector 146. For instance, as best shown in FIGS. 1 and 2, the housing 170 of the present embodiment includes both of said openings 190 and 192. As further shown in FIG. 2, each speaker 144 is arranged generally behind (i.e. aligned in the front-to-back or longitudinal direction x) with a respective subset of the one or more speaker openings 190, and the smoke detector 146 is similarly arranged generally behind (i.e. aligned in the front-to-back or longitudinal direction x) with the one or more sensor openings 192.

Turning to FIG. 2, the location and information indicator device 110 may further include at least one wall mount 194 facilitating mounting the housing 170 of the location and information indicator device 110 to a wall, vertical platform, or other vertical surface or structure, which may be generally flat. For instance, in some embodiments, the at least one wall mount 194 may include one or more fastener openings configured to receive and become suspended on one or more fasteners (e.g., bolts or hooks), not shown, attached to the wall, platform or otherwise vertical structure.

Figure 6:
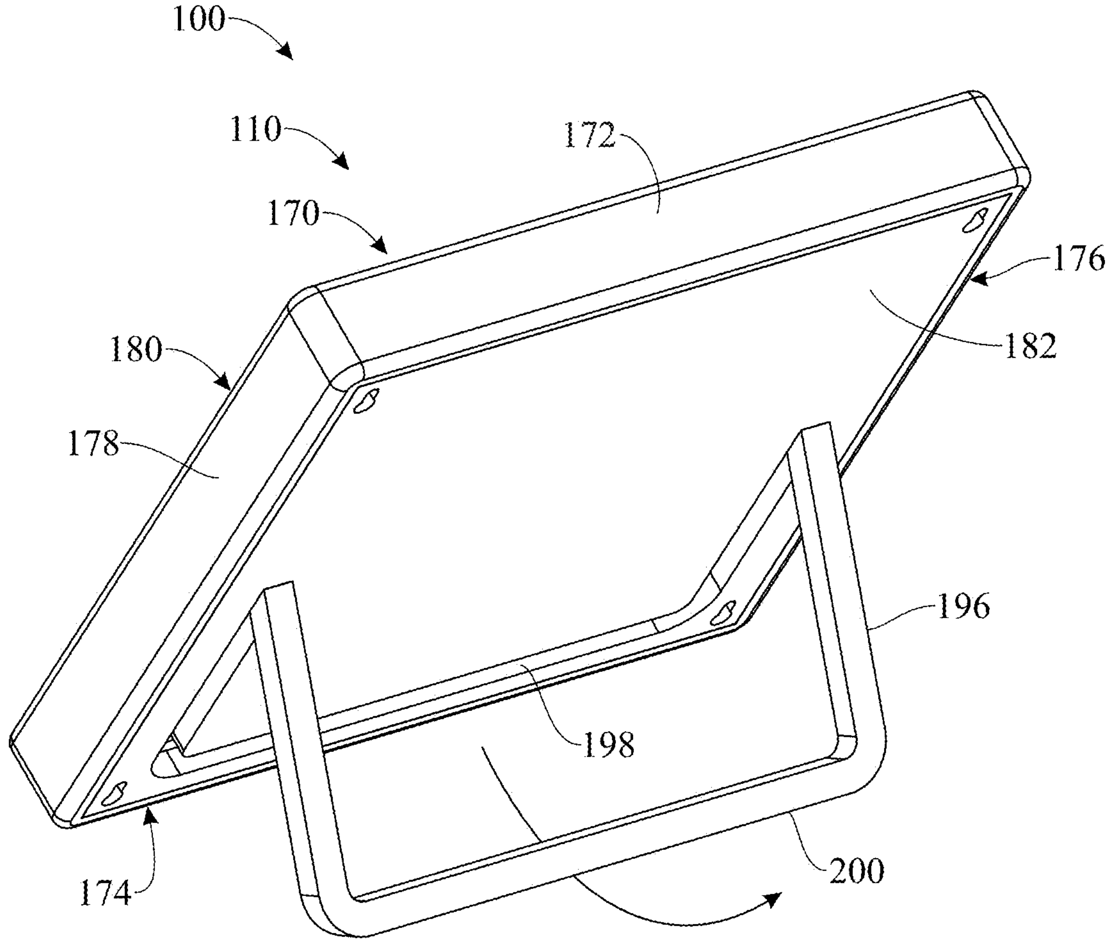
FIG. 6 presents a top, rear isometric view of the location and information indicator device of FIG. 1, with the deployable support of the location and information indicator device shown deployed.

With continued reference to FIG. 2, the housing 170 may further include a floor mount 196 facilitating supporting the housing 170 on a floor, ground, yard, lawn, or other similar structure or surface. In some embodiments, the floor mount 196 may be deployable such that, when deployed, a wider, more stable contact is created between the ground and the housing 170 (including the deployed floor mount 196). For example, the floor mount 196 of the present embodiment is formed as a U-shaped leg, pivotably connected to the rear side 182 of the housing 170, and pivotally movable between a storage or undeployed position (FIG. 2) and a deployed position (FIG. 6). In the storage or undeployed position (FIG. 2), the floor mount 196 may be received within a recess 198 (FIG. 6) formed in the rear side 182 of the housing 170, such that the floor mount 196 does not protrude outward (rearward) from the recess 198. In the deployed position (FIG. 6), the floor mount 196 is pivoted upward such that a bottom 200 of the floor mount 196 is separated from the bottom side 174 of the housing 170; in the deployed position, the floor mount 196 allows the location and information indicator device 110 to more stably rest (via the bottom 200 of the floor mount 196 and the bottom side 174 of the housing 170) on a horizontal surface with respect to the undeployed position (FIG. 2). Furthermore, the deployed floor mount 196 may provide a handle which is capable of being grasped in order to transport the location and information indicator device 110.

In further embodiments, the location and information indicator device 110 may be configured to float in water. For instance, the housing 170 may be configured to float in water and/or attachable to a floatation device or structure which imparts water-buoyancy to the location and information indicator device 110. Such embodiments may allow the location and information indicator system 100 to provide a visual indication within a water body such as the ocean, a lake, etc.

As will be described in greater detail hereinafter, the at least one light emitter 120 operatively interfaces with, and is controlled by, the controller 140. The controller 140 may activate the at least one light emitter 120 to provide a beacon or signaling of a specific physical location to a nearby party of interest who is attempting to locate and access (e.g., drive towards) the specific physical location. In different embodiments, the at least one light emitter 120 may be illuminated by the controller 140 in a single manner or pattern (e.g., fixed or flashing) or in different patterns (e.g., fixed, flashing, etc.). In some embodiments, one or more aspects of the illumination may be adjustable; for example, the user may adjust a light signal intensity, flashing ON and OFF interval durations, etc. In some embodiments, the at least one light emitter 120 is configured to emit light outside of the housing 170 which is visible from a distance of at least about 1,000 feet (about 300 m), and more preferably, at least about 2,500 feet (about 760 m).

In some embodiments, the location and information indicator device 110 may be configured to provide a single color-coded visual indication, such as, but not limited to, a single color visual indication a single color-combination visual indication. For instance, the location and information indicator device 110 may be configured to illuminate in red, which may better distinguish the illuminated, location and information indicator device 110 from nearby house, city, and vehicle lights. In such embodiments, the non-opaque portion(s) of the housing 170 (e.g., the non-opaque portion 188) may be translucent and red-colored and/or the at least one light emitter 120 may be configured to emit a red light. In preferred embodiments, such as the present embodiment, the non-opaque portion 188 on the front side 180 of the housing 170 is red-colored and translucent, and more preferably, uniformly translucent therealong, such that the non-opaque portion 188, when illuminated, resembles a large red lamp or “red moon” which may better stand out from nearby home, city, and vehicle lights.

In other embodiments, the location and information indicator device 110 may be configured to alternatively and selectively provide two or more different color-coded visual indications. For example, the location and information indicator device 110 may be configured to selectively and alternatively illuminate in a first color (e.g., the red color as described heretofore) and a different, second color (e.g., a yellow color). In one example of such embodiment, the non-opaque portion(s) of the housing 170 (e.g., the non-opaque portion 188) may be translucent and divided into different areas, each colored in one of the respective first color and second color and/or the at least one light emitter 120 may be configured to selectively and alternatively emit a red and a yellow light. For example, in an embodiment provided with the constructive elements of FIGS. 1-3, the non-opaque portion 188 on the front side 180 of the housing 170 may be generally neutral in color and translucent, and more preferably, uniformly translucent therealong, and the at least one light emitter 120 may include red-light-emitting LEDs and yellow-light-emitting LEDs; the non-opaque portion 188, when illuminated, may selectively resembles a large red lamp or “red moon” or a large yellow lamp or “yellow moon”, which may respectively indicate an emergency or a non-emergency situation, for instance and without limitation.

Figure 5:
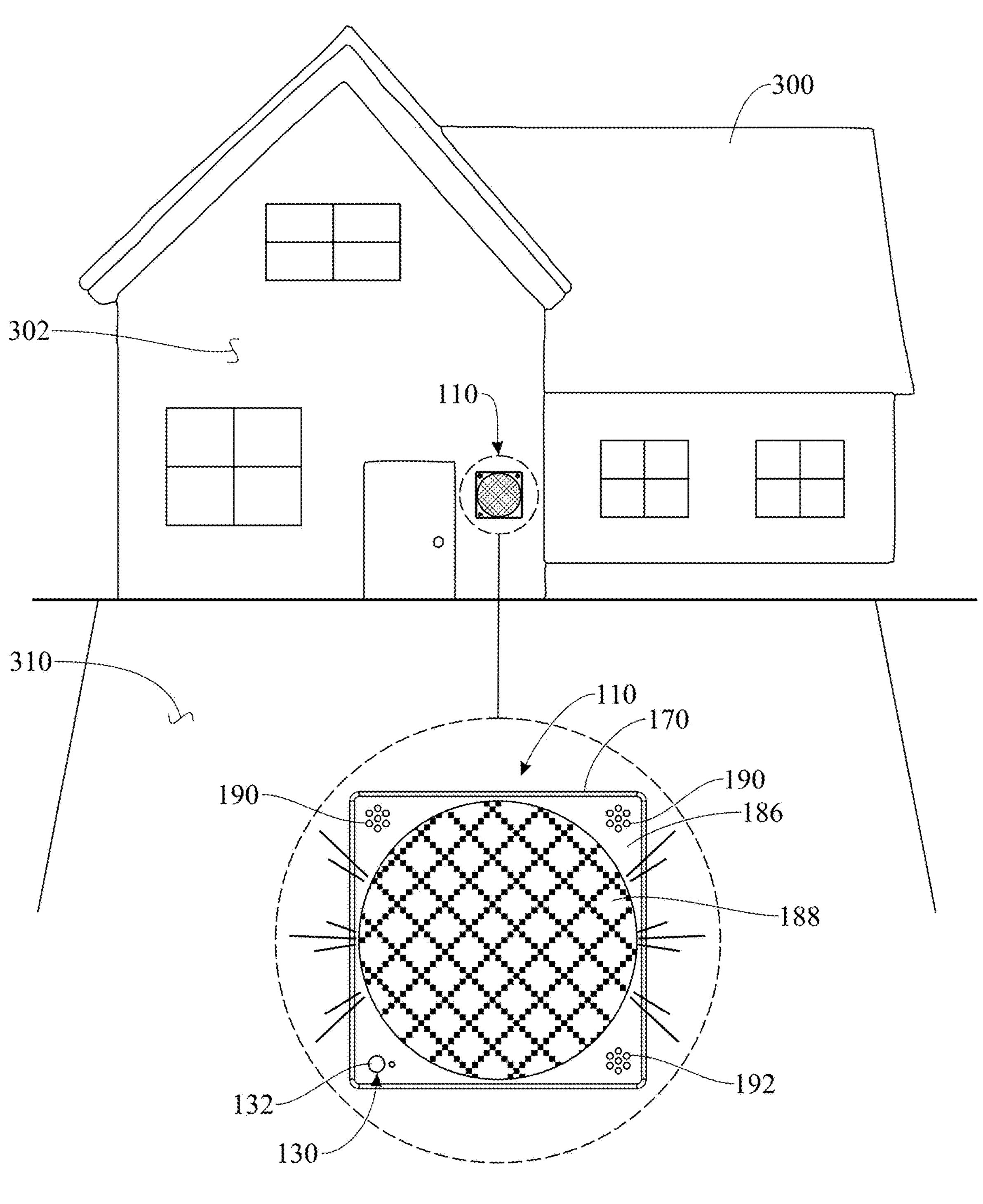
FIG. 5 presents a front elevation view of a building featuring a location and information indicator device installed on a wall of the building in accordance with a first installation mode of the location and information indicator device of FIG. 1, the figure further showing an enlarged view of the location and information indicator device providing a visual indication or beacon.

In operation of the location and information indicator system 100, and with reference initially to FIG. 5, the location and information indicator device 110 may be attached to a building 300 which is under construction, or retrofitted to an existing building 300. For example, the housing 170 may be secured to a wall, exterior covering, or other generally vertical structure of the building 300, hereinafter referred to as structure 302, such as by using the wall mount 194 as heretofore described. In another example, the housing 170 may be embedded into an opening formed in the structure 302; when embedded, the front side 180 of the housing 170 may preferably be arranged flush with the outer surface of the wall or structure 302. The location and information indicator device 110 may be positioned in or on an open, conspicuous, clearly visible location, not blocked by trees, cars, or other inhibitors. In different installations, the device may be permanently or non-permanently (disconnectably) attached to the structure 302. Once installed, the location and information indicator device 110 may be powered on, as heretofore described.

In preferred embodiments, one or more third parties of interest may have been informed, trained or otherwise made aware that a visual indication of the type provided by the location and information indicator system 100 is to be understood as a beacon indicative of a specific physical location which is of interest to the third party. For example, ambulance personnel, fire rescue personnel, or law enforcement officers may have been trained to recognize a specific visual indication provided by the location and information indicator system 100 (e.g., a circular, relatively large and uniformly lit, flashing red light) as constituting an emergency dispatch location indicator or beacon. In some embodiments, the location and information indicator system may include a first training material (e.g., non-transitory computer-readable storage media or signal, printed publication, etc.) in which the light is associated with or described as being indicative of an emergency situation. The first training material may provide an instruction to expeditiously direct a person or vehicle towards the specific visual indication (light) upon viewing and identifying said light; for example, the first training material may teach that the first-responder-type party of interest viewing the specific visual indication immediately or expeditiously direct him/herself or his/her vehicle towards the light once the light has been identified as being associated to an emergency situation.

In another example, delivery service personnel may have been trained or educated to recognize a specific visual indication provided by the location and information indicator system 100 (e.g., a circular, relatively large and uniformly lit, fixed yellow light) as constituting a location indicator or beacon. In some embodiments, the location and information indicator system may include a second training material (e.g., non-transitory computer-readable storage media or signal, printed publication, etc.) in which the light is associated with or described as being indicative of a non-emergency situation. The second training material may provide an instruction to direct a person or vehicle towards the specific visual indication (light) upon viewing and identifying said light; for example, the second training material may teach that the delivery service or other similar party of interest viewing the specific visual indication direct him/herself or his/her vehicle towards the light once the light has been identified as being associated to a non-emergency situation.

In the event of an emergency at or in the area of the building 300 at which the location and information indicator device 110 is installed, a user may operate an activation switch 132 of the location and information indicator device 110 to activate an emergency beacon mode of operation of the location and information indicator device 110. For example, in some embodiments, the user may press or otherwise operate the activation switch 132 on the front side 180 of the housing 170. In another example, the user may press or otherwise operate an external activation switch 132*a*, which may be mounted to a wall or other inside structure of the building 300 and readily accessible by the user. In yet another example, the user may operate the remote control device 160 (e.g., a smartphone or other portable electronic device managed by the user) to provide an activation signal to the location and information indicator device 110 via the communication module 148. In yet another example, a remote control device 160 (e.g., a computer server located at, or associated with, a 911 or other emergency call receiving center) may communicate via a computer network with the location and information indicator device 110, such as via the communication module 148, to remotely provide an activation signal to the controller 140 of the location and information indicator device 110. In some embodiments, upon sensing smoke, the smoke detector 136 of the location and information indicator device 110 may transmit an activation signal to the controller 140.

Responsively to receiving an activation signal from an activation switch 132/132*a*, remote control device 160, or smoke detector 136, the controller 140 of the location and information indicator device 110 may enable electric power transmission from the power source (e.g., battery 124) to the at least one light emitter 120 to illuminate the at least one light emitter 120. Upon activation of the at least one light emitter 120, light may be projected through the non-opaque portion(s) of the housing 170 as heretofore described. The light may be projected in accordance with a first color-coding which is associated with emergency situations; for example, a circular, relatively large and uniformly lit, flashing red light may be projected from the non-opaque portion 188 on the front side 180 of the housing 170. First responders who are circulating the area as a result of the 911 or other emergency call placed by the user may view the first-color-coded beacon (e.g., circular, relatively large and uniformly lit, flashing red light) and, by virtue of the training or education step, may recognize that the first-color-coded beacon is indicative of the physical location corresponding to the emergency dispatch they have been deployed to attend; consequently, the first responders may expeditiously direct themselves or their vehicle towards the light, which thereby constitutes an intuitive and useful emergency beacon. In some embodiments, the controller 140 may further activate the one or more speakers 144 to emit a siren or audible alarm which complements the visible beacon and further facilitates directing the first responders towards the location and information indicator device 110. This complementary, audible signal may further assist the emergency responders in locating the dwelling, such as in poor visibility conditions caused by adverse weather, growing plants or trees, etc.

In some embodiments, as heretofore described, the location and information indicator device 110 may be configured to alternatively illuminate in a second color-coding (e.g., providing a circular, relatively large and uniformly lit, fixed yellow light), to indicate a non-emergency situation. In such cases, the user may utilize the location and information indicator device 110 to provide a visual beacon to a non-emergency-related third party of interest, such as, but not limited to, delivery service personnel, a relative or friend, etc. For this purpose, the user may operate a different activation switch 132 or 132*a* of the location and information indicator device 110, associated with a non-emergency beacon mode of operation, and/or a user-operated, remote control device 160 (e.g., phone, etc.) to activate the non-emergency beacon mode of operation of the location and information indicator device 110, as heretofore described, thereby generating a non-emergency activation signal.

Responsively to receiving a non-emergency activation signal from an activation switch 132/132*a* or from a remote control device 160, the controller 140 of the location and information indicator device 110 may enable electric power transmission from the power source (e.g., battery 124) to the at least one light emitter 120 to illuminate the at least one light emitter 120 in a different, second color-coding, as heretofore described. Upon activation of the at least one light emitter 120, light may be projected through the non-opaque portion(s) of the housing 170 in the second color-coding, which is associated with non-emergency situations; for example, a circular, relatively large and uniformly lit, fixed yellow light may be projected from the non-opaque portion 188 on the front side 180 of the housing 170. Delivery personnel, friends, relatives or other parties of interest who are circulating the area to deliver a good, visit the building 300, or to carry out another applicable action, may view the second-color-coded beacon and, by virtue of the training or education step, may recognize that the second-color-coded beacon is indicative of the physical location corresponding to the non-emergency service or visit or reason for accessing the building 300; responsively, the parties of interest may efficiently direct themselves or their vehicle towards the light, which thus serves as a non-emergency beacon. In some embodiments, the controller 140 may further activate the one or more speakers 144 to emit a different sound with respect to the emergency beacon mode of operation. This complementary, audible signal may further assist the non-emergency parties of interest in locating the dwelling, such as in poor visibility conditions caused by adverse weather, growing plants or trees, etc.

Once the emergency or non-emergency beacon is no longer necessary, or applicable, the at least one indicator light emitter 120 may be switched off by operating an activation switch 132 or 132*a*, and/or remote control device 160, similarly as was heretofore described with reference to the activation of the at least one indicator light emitter 120. Alternatively or additionally, the at least one light emitter 120 may be automatically switched off by the controller 140 after a predetermined time; the predetermined time may be different in the emergency and non-emergency modes of operation of the location and information indicator device 110.

Figure 7:
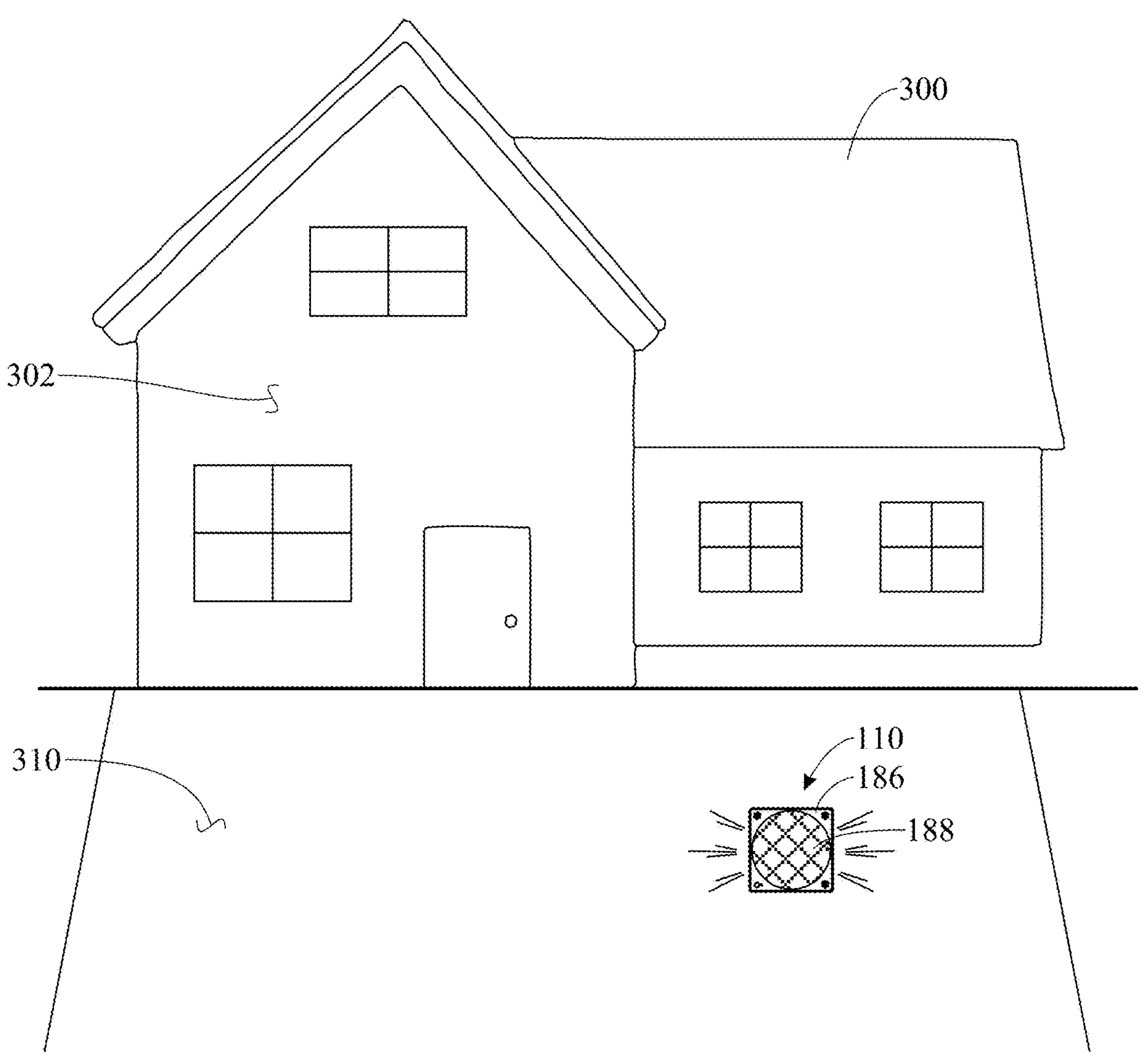
FIG. 7 presents a front elevation view of a building featuring a location and information indicator device installed detached from the building, such as on a driveway of the building, in accordance with a second installation mode of the location and information indicator device of FIG. 1.

Turning now to FIGS. 6 and 7, the location and information indicator device 110 may instead be installed or positioned on a non-vertical surface, and more preferably, a generally horizontal surface such as, but not limited to, the ground 310, in or on an open, conspicuous, clearly visible location, not blocked by trees, cars, or other inhibitors; for example, the location and information indicator device 110 may be placed on a driveway or yard in front of the building 300. Prior to resting the location and information indicator device 110 on the ground 310, the floor mount 196 may be moved from the undeployed position (FIGS. 1-2) to the deployed position (FIG. 6) relative to the housing 170, thereby providing two spaced-apart contact areas between the location and information indicator device 110 and the ground 310, the contact areas defined by the bottom side 174 of the housing 170 and the bottom 200 of the floor mount 196, respectively. The spaced-apart contact areas provide an increased stability when resting the location and information indicator device 110 on the ground 310. In some embodiments, in which a floor mount 196 may or may not be present, the bottom side 174 of the housing 170 alone may be shaped and sized to provide a sufficiently stable contact on a horizontal surface or ground to enable the housing 170 to stand upright on the bottom side 174. Once installed in this separate, detached position as shown in FIGS. 6 and 7, the location and information indicator system 100 and device 110 may operate generally the same as was heretofore described with reference to FIG. 5.

Figure 8:
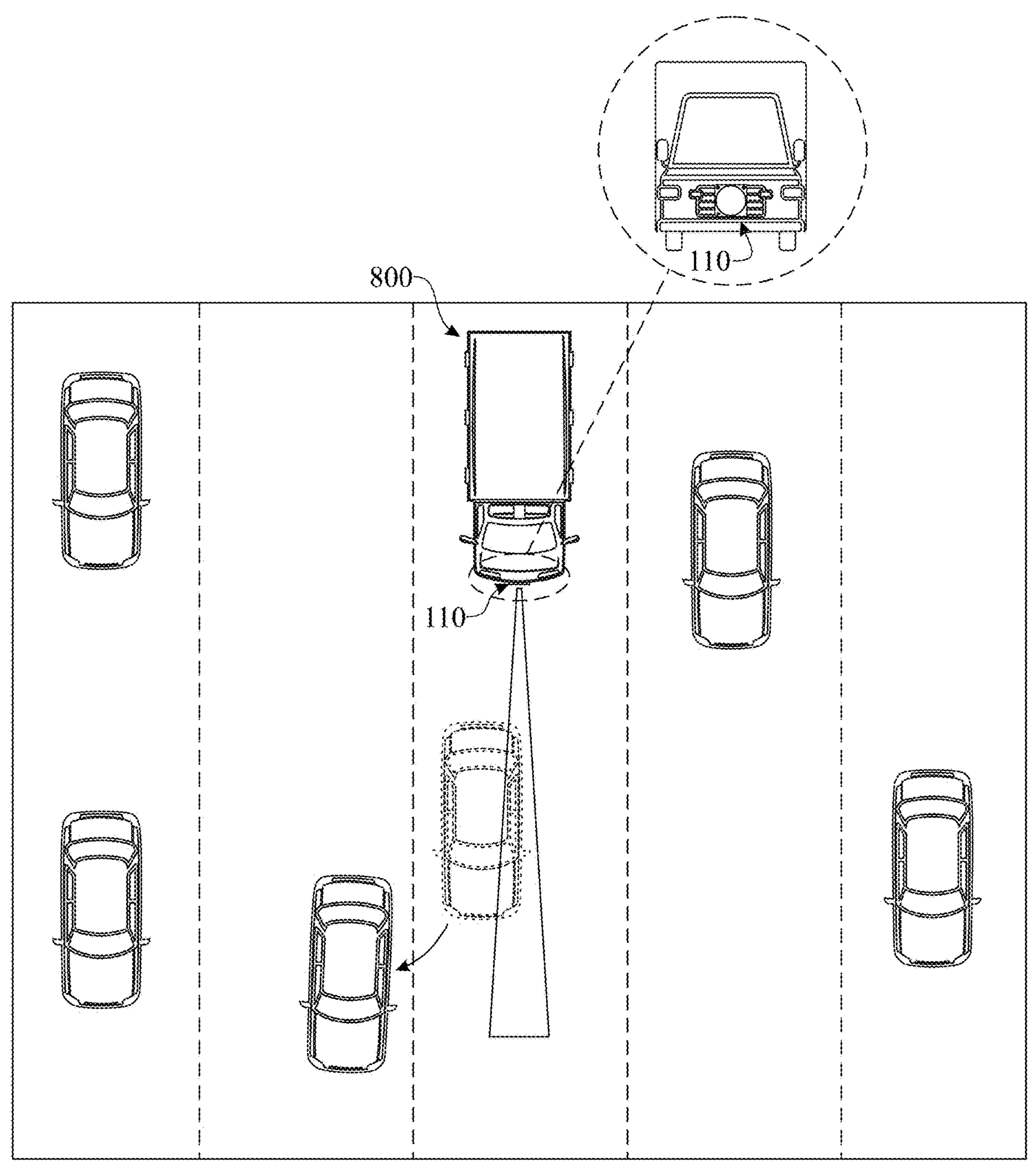
FIG. 8 presents a 911 emergency vehicle featuring the location and information indicator device in accordance with an illustrative embodiment of the invention.

Turning now to FIG. 8, the location and information indicator device 110 (also known as the Red Moon) is placed in a 911 emergency vehicle 800 such as, but not limited to, an ambulance, a firetruck, a police car, or the like. The location and information indicator device 110 is a compact device that is integrated into or attached to the front grille of the 911 emergency vehicle 800. As can be seen in FIG. 8, the location and information indicator device 110 is configured to project a red static-light-ray or flashing-light-ray outward over adjustable distances, providing a clear and highly visible signal to other road users. This light ray may extend outward for distances such as ¼ mile, ½ mile, or any other adjustable range suitable for specific traffic conditions, environmental settings, or operational needs.

In some embodiments, the Red Moon device serves as a multi-functional device that provides emergency signaling, location indication, directional guidance, and traffic information. By projecting a visible red light ray ahead of the emergency vehicle, it communicates to drivers on highways and roads that the vehicle is actively responding to an emergency. The projected light instructs road users to take appropriate actions such as slowing down, moving over to the right or left lanes, or pulling over and stopping to clear the path for the emergency vehicle.

Further, unlike traditional sirens and flashing lights that rely heavily on auditory signals, Red Moon enhances visual communication between emergency responders and drivers. This is especially effective in high-noise environments, areas with reduced visibility, or when drivers fail to notice sirens due to distractions. The use of a red light ray adds an additional layer of urgency and directionality, ensuring that all road users are aware of the emergency vehicle's presence and its intended path. The present invention thus provides a signaling beacon or light, which is easily and cost-effectively mountable at or adjacent to a residence or other dwelling, and is rapidly operable to alert drivers, such as ambulance drivers or delivery drivers, of the location of the residence or other dwelling. The present invention may greatly assist in solving the problem of building number or other building information invisibility, often caused by the fact that building information is not uniformly placed (e.g., arranged in a same location or orientation) at each building, and is often blocked by objects such as trees, newer construction, etc., or is simply no longer present. The present invention helps prevent emergency responders, delivery services, or other parties of interest from having to look intensively to find the destination numbers even in broad daylight, by providing a clear, unadulterated, and unique visible indication at a relatively large distance (preferably at least 1,000 feet) from the emergency or non-emergency location. The parties of interest know to look for the device, which is facilitated by the unique shape, color, and size of the illuminating beacon in some embodiments.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A location and information indicator device, comprising:
- at least one light emitter;
- one or more of a handle and kickstand for portable deployment of the location and information indicator device;
- a smoke detector configured to detect a presence of smoke;
- a controller, coupled to the at least one light emitter, configured to receive an activation signal and activate the at least one light emitter, wherein the at least one light emitter is configured to emit light in at least one color coding upon activation; and
- a housing, enclosing the at least one light emitter, the housing comprising one or more non-opaque portions configured to allow the light emitted by the at least one light emitter to project outward and upward from the housing, radially and transversely beyond the one or more non-opaque portions over a broader light pattern than a dimension of the one or more non-opaque portions, to a projection distance for indicating a physical location of the location and information indicator device, wherein the one or more non-opaque portions comprise a diffuser configured to scatter and spread the light in the broader light pattern when the light emitted by the at least one light emitter is projected outward and upward from the housing, radially and transversely beyond the one or more non-opaque portions,
- wherein the controller is configured to adjust the projection distance of the emitted light,
- wherein the controller is configured to receive the activation signal from the smoke detector; and
- wherein the controller is further configured to remotely receive the activation signal from a remote control device formed as a separate device with respect to the location and information indicator device and coupled communicatively with the location and information indicator device, the remote control device being one or more of: an electronic device communicating with the location and information indicator device via a computer network, and a portable electronic device carried by a user.

2. The location and information indicator device of claim 1, wherein the at least one color coding comprises a first color coding for an emergency situation and a second color coding for a non-emergency situation, and wherein the first color coding comprises a flashing red light for indicating the emergency situation and the second color coding comprises a fixed yellow light for indicating the non-emergency situation.

3. The location and information indicator device of claim 1, wherein the controller is further configured to activate one or more speakers to emit an audible sound based on the activation signal.

4. The location and information indicator device of claim 1, wherein the activation signal comprises one of an emergency activation signal and a non-emergency activation signal.

5. The location and information indicator device of claim 1, wherein the controller is further configured to receive the activation signal from an activation switch located on the housing, and wherein the activation switch comprises one or more input elements for generating the activation signal that comprises one of an emergency activation signal and a non-emergency activation signal.

6. The location and information indicator device of claim 2, wherein the controller is configured to activate the at least one light emitter in the first color coding upon receiving the activation signal.

7. The location and information indicator device of claim 1, wherein the one or more non-opaque portions comprises a single non-opaque portion located on a front side of the housing, and wherein the single non-opaque portion comprises a round non-opaque portion.

8. The location and information indicator device of claim 7, wherein the front side comprises at least one opaque portion arranged about a periphery of the round non-opaque portion.

9. The location and information indicator device of claim 1, further comprising a power source configured to provide a power supply to the controller and the at least one light emitter.

10. A method for providing an illuminating visual indication of a location using a portable location and information indicator device, the method comprising:

receiving, by the location and information indicator device that comprises one or more of a handle and kickstand for portable deployment of the location and information indicator device, an activation signal, wherein the activation signal is received from any of a smoke detector configured to detect a presence of smoke and a remote control device formed as a separate device with respect to the location and information indicator device, the remote control device being one or more of: an electronic device communicating with the location and information indicator device via a computer network, and a portable electronic device carried by a user;

activating at least one light emitter of the location and information indicator device based on the received activation signal, wherein the at least one light emitter is configured to emit light in at least one color coding upon activation, wherein the at least one light emitter is enclosed in a housing of the location and information indicator device that comprises one or more non-opaque portions, and wherein the one or more non-opaque portions are configured to allow the light emitted by the at least one light emitter to project outward and upward from the housing, radially and transversely beyond the one or more non-opaque portions over a broader light pattern than a dimension of the one or more non-opaque portions, to a projection distance for indicating a physical location of the location and information indicator device, and wherein the one or more non-opaque portions comprise a diffuser configured to scatter and spread the light in the broader light pattern when the light emitted by the at least one light emitter is projected outward and upward from the housing, radially and transversely beyond the one or more non-opaque portions; and adjusting the projection distance of the emitted light.

11. The method of claim 10, wherein the at least one color coding comprises a first color coding for an emergency situation and a second color coding for a non-emergency situation, and wherein the first color coding comprises a flashing red light for indicating the emergency situation and the second color coding comprises a fixed yellow light for indicating the non-emergency situation.

12. The method of claim 10, further comprising:

activating one or more speakers to emit an audible sound based on the activation signal.

13. The method of claim 10, wherein the activation signal comprises one of an emergency activation signal and a non-emergency activation signal.

14. The method of claim 10, wherein the activation signal is further received from an activation switch located on the housing, wherein the activation switch comprises one or more input elements for generating the activation signal that comprises one of an emergency activation signal and a non-emergency activation signal.

15. The method of claim 11, further comprising:

detecting a presence of smoke by the smoke detector; and transmitting the activation signal to a controller upon detection, wherein the controller is configured to activate the at least one light emitter in the first color coding upon receiving the activation signal.

16. The method of claim 10, wherein the one or more non-opaque portions comprises a single non-opaque portion located on a front side of the housing, wherein the single non-opaque portion comprises a round non-opaque portion.

17. The method of claim 16, wherein the front side comprises at least one opaque portion arranged about a periphery of the round non-opaque portion.

18. The method of claim 10, further comprising:

providing a power supply to a controller and the at least one light emitter.

19. A location and information indicator system, comprising:

a location and information indicator device; and a remote device formed as a separate device with respect to the location and information indicator device and coupled to the location and information indicator device, the remote device being one or more of: an electronic device communicating with the location and information indicator device via a computer network, and a portable electronic device carried by a user, wherein the location and information indicator device comprises:

at least one light emitter;

one or more of a handle and kickstand for portable deployment of the location and information indicator device;

a smoke detector configured to detect a presence of smoke;

a controller, coupled to the at least one light emitter, configured to receive an activation signal and activate the at least one light emitter, wherein the at least one light emitter is configured to emit light in at least one color coding upon activation; and a housing, enclosing the at least one light emitter, the housing comprising one or more non-opaque portions configured to allow the light emitted by the at least one light emitter to project outward and upward from the housing, radially and transversely beyond the one or more non-opaque portions over a broader light pattern than a dimension of the one or more non-opaque portions, to a projection distance for indicating a physical location of the location and information indicator device, wherein the one or more non-opaque portions comprise a diffuser configured to scatter and spread the light in the broader light pattern when the light emitted by the at least one light emitter is projected outward and upward from the housing, radially and transversely beyond the one or more non-opaque portions, wherein the controller is configured to adjust the projection distance of the emitted light, and wherein the controller is configured to receive the activation signal from any of the smoke detector and the remote device.

20. The location and information indicator system of claim 19, wherein the remote device is configured to transmit the activation signal that comprises one of an emergency activation signal and a non-emergency activation signal.

* * * * *